(12) United States Patent
Lee et al.

(10) Patent No.: US 11,810,575 B2
(45) Date of Patent: Nov. 7, 2023

(54) ARTIFICIAL INTELLIGENCE ROBOT FOR PROVIDING VOICE RECOGNITION FUNCTION AND METHOD OF OPERATING THE SAME

(71) Applicant: LG ELECTRONICS INC., Seoul (KR)

(72) Inventors: Inho Lee, Seoul (KR); Junmin Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 471 days.

(21) Appl. No.: 16/499,015

(22) PCT Filed: Jun. 12, 2019

(86) PCT No.: PCT/KR2019/007062
§ 371 (c)(1),
(2) Date: Sep. 27, 2019

(87) PCT Pub. No.: WO2020/251074
PCT Pub. Date: Dec. 17, 2020

(65) Prior Publication Data
US 2021/0407517 A1  Dec. 30, 2021

(51) Int. Cl.
*G10L 17/06* (2013.01)
*G10L 15/08* (2006.01)
*G10L 25/54* (2013.01)

(52) U.S. Cl.
CPC ............ *G10L 17/06* (2013.01); *G10L 15/08* (2013.01); *G10L 25/54* (2013.01); *G10L 2015/088* (2013.01)

(58) Field of Classification Search
CPC ......... G10L 17/06; G10L 15/08; G10L 25/54; G10L 2015/088
See application file for complete search history.

(56) References Cited

U.S. PATENT DOCUMENTS

| | | | |
|---|---|---|---|
| 9,123,351 B2* | 9/2015 | Katagiri | G10L 15/00 |
| 10,997,971 B2* | 5/2021 | Mitchell | G10L 15/08 |
| 2004/0225498 A1* | 11/2004 | Rifkin | G10L 15/00 |
| 2013/0218339 A1* | 8/2013 | Maisonnier | G05B 15/00 |
| 2015/0026580 A1* | 1/2015 | Kang | H04W 76/02 |

(Continued)

FOREIGN PATENT DOCUMENTS

| | | |
|---|---|---|
| KR | 10-2011-0124568 A | 11/2011 |
| KR | 10-2017-0044426 A | 4/2017 |

(Continued)

*Primary Examiner* — Richemond Dorvil
*Assistant Examiner* — Ethan Daniel Kim
(74) *Attorney, Agent, or Firm* — Birch, Stewart, Kolasch & Birch, LLP

(57) ABSTRACT

An artificial intelligence robot for providing a voice recognition service includes a memory configured to store voice identification information, a microphone configured to receive a voice command; and a processor configured to extract voice identification information from a wake-up command included in the voice command and used to activate the voice recognition service and operate the voice recognition function in a deactivation state when the extracted voice identification information does not match the voice identification information stored in the memory.

11 Claims, 6 Drawing Sheets

(56) References Cited

U.S. PATENT DOCUMENTS

| | | | |
|---|---|---|---|
| 2016/0343376 A1 | 11/2016 | Cai et al. | |
| 2017/0053662 A1* | 2/2017 | Nakadai | G10L 21/028 |
| 2017/0110117 A1 | 4/2017 | Chakladar et al. | |
| 2018/0211665 A1* | 7/2018 | Park | G10L 15/22 |
| 2018/0301151 A1* | 10/2018 | Mont-Reynaud | G10L 15/22 |
| 2019/0301151 A1* | 10/2019 | Shiohara et al. | G10L 15/22 |
| 2020/0098380 A1* | 3/2020 | Tai | G10L 19/018 |
| 2020/0349230 A1* | 11/2020 | Yoshioka | G06F 17/28 |

FOREIGN PATENT DOCUMENTS

| | | |
|---|---|---|
| KR | 10-2017-0103925 A | 9/2017 |
| KR | 10-2019-0026518 A | 3/2019 |

\* cited by examiner

ARTIFICIAL INTELLIGENCE ROBOT FOR PROVIDING VOICE RECOGNITION FUNCTION AND METHOD OF OPERATING THE SAME

CROSS REFERENCE TO RELATED APPLICATION

This application is the National Phase of PCT International Application No. PCT/KR2019/007062, filed on Jun. 12, 2019, which is hereby expressly incorporated by reference into the present application.

TECHNICAL FIELD

The present invention relates to an artificial intelligence robot and, more particularly, to an artificial intelligence robot for providing a voice recognition function.

BACKGROUND ART

Competition for voice recognition technology which has started in smartphones is expected to become fiercer in the home with diffusion of the Internet of things (IoT).

In particular, an artificial intelligence (AI) device capable of issuing a command using voice and having a talk is noteworthy.

A voice recognition service has a structure for selecting an optimal answer to a user's question using a vast amount of database.

A voice search function refers to a method of converting input voice data into text in a cloud server, analyzing the text and retransmitting a real-time search result to a device.

The cloud server has a computing capability capable of dividing a large number of words into voice data according to gender, age and intonation and storing and processing the voice data in real time.

As more voice data is accumulated, voice recognition will be accurate, thereby achieving human parity.

When there is a plurality of artificial intelligence devices, a user utters a wake-up word to select a device to be controlled.

Since a user may not know a wake-up word, an artificial intelligence robot may periodically output a message for guiding a wake-up word.

In this case, another artificial intelligence robot may recognize the wake-up word output from the artificial intelligence robot as a wake-up word uttered by the user and thus activate a voice recognition function.

Therefore, another artificial intelligence robot may be activated without the intention of the user, thereby causing erroneous operation.

DISCLOSURE

Technical Problem

An object of the present invention is to prevent activation of a voice recognition function of an artificial intelligence robot according to a wake-up word guidance message output from an external artificial intelligence robot.

Another object of the present invention is to prevent activation of a voice recognition function of an artificial intelligence robot according to a wake-up word guidance message output from an external artificial intelligence robot and erroneous operation of the artificial intelligence robot according to received voice.

Technical Solution

According to an embodiment of the present invention, an artificial intelligence robot can extract voice identification information from a wake-up command used to activate a voice recognition service and determine whether the wake-up command is output from another artificial intelligence robot or uttered by a user.

According to an embodiment of the present invention, the voice identification information may be extracted from the wake-up command and the voice recognition function may not be activated upon determining that the wake-up word is output from another artificial intelligence robot using the extracted voice identification information.

Advantageous Effects

According to the embodiment of the present invention, the voice recognition function of an artificial intelligence robot may not be activated by a wake-up word guidance message output from an external artificial intelligence robot, thereby preventing the artificial intelligence robot from erroneously operating without the intention of a user.

BEST MODE

<Artificial Intelligence (AI)>

Figure 1:
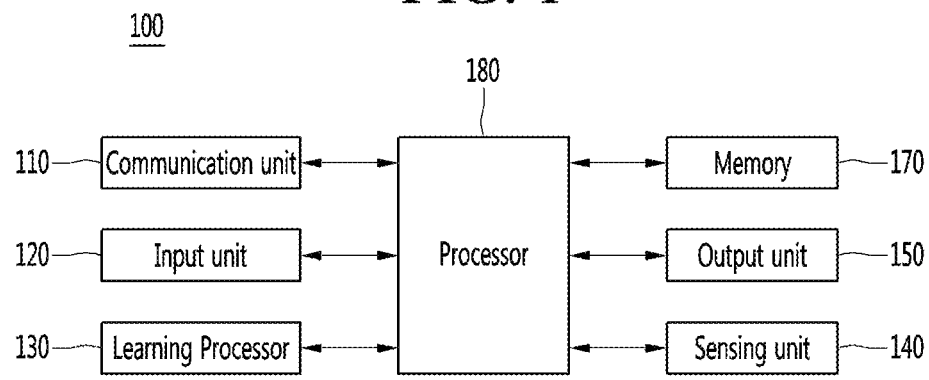
FIG. 1 is a diagram showing an artificial intelligence (AI) device according to an embodiment of the present invention.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
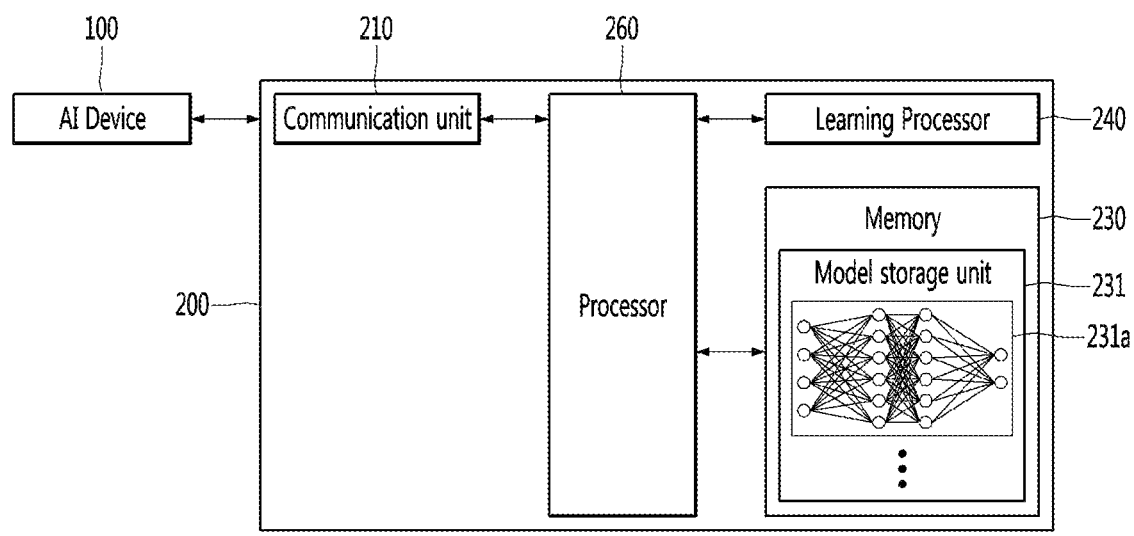
FIG. 2 is a diagram showing an AI server according to an embodiment of the present invention.

FIG. 2 illustrates an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
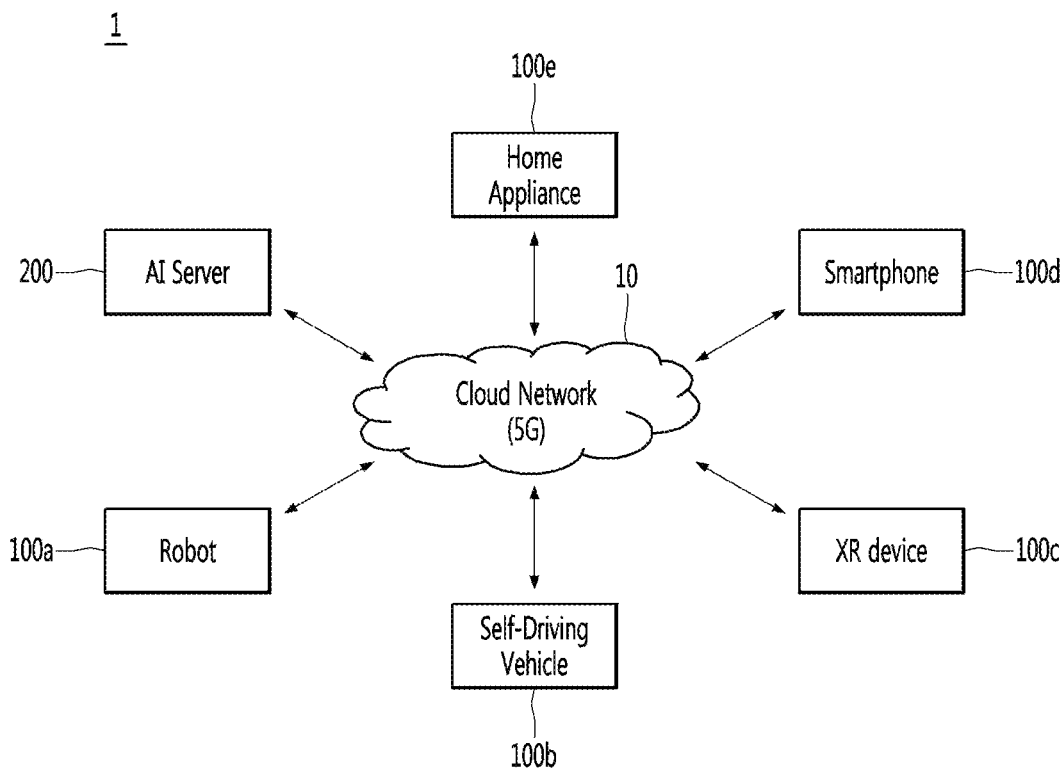
FIG. 3 is a diagram showing an AI system according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100*d*, or the home appliance 100*e*, to which the AI technology is applied, may be referred to as AI devices 100*a* to 100*e*.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100*a* to 100*e* and 200 configuring the AI system 1 may be connected to each other through the cloud network 10. In particular, each of the devices 100*a* to 100*e* and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100*a*, the self-driving vehicle 100*b*, the XR device 100*c*, the smartphone 100*d*, or the home appliance 100*e* through the cloud network 10, and may assist at least part of AI processing of the connected AI devices 100*a* to 100*e*.

At this time, the AI server 200 may learn the artificial neural network according to the machine learning algorithm instead of the AI devices 100*a* to 100*e*, and may directly store the learning model or transmit the learning model to the AI devices 100*a* to 100*e*.

At this time, the AI server 200 may receive input data from the AI devices 100*a* to 100*e*, may infer the result value for the received input data by using the learning model, may generate a response or a control command based on the inferred result value, and may transmit the response or the control command to the AI devices 100*a* to 100*e*.

Alternatively, the AI devices 100*a* to 100*e* may infer the result value for the input data by directly using the learning model, and may generate the response or the control command based on the inference result.

Hereinafter, various embodiments of the AI devices 100*a* to 100*e* to which the above-described technology is applied will be described. The AI devices 100*a* to 100*e* illustrated in FIG. 3 may be regarded as a specific embodiment of the AI device 100 illustrated in FIG. 1.

<AI+Robot>

The robot 100*a*, to which the AI technology is applied, may be implemented as a guide robot, a carrying robot, a cleaning robot, a wearable robot, an entertainment robot, a pet robot, an unmanned flying robot, or the like.

The robot 100*a* may include a robot control module for controlling the operation, and the robot control module may refer to a software module or a chip implementing the software module by hardware.

The robot 100*a* may acquire state information about the robot 100*a* by using sensor information acquired from various kinds of sensors, may detect (recognize) surrounding environment and objects, may generate map data, may determine the route and the travel plan, may determine the response to user interaction, or may determine the operation.

The robot 100*a* may use the sensor information acquired from at least one sensor among the lidar, the radar, and the camera so as to determine the travel route and the travel plan.

The robot 100*a* may perform the above-described operations by using the learning model composed of at least one artificial neural network. For example, the robot 100*a* may recognize the surrounding environment and the objects by using the learning model, and may determine the operation by using the recognized surrounding information or object information. The learning model may be learned directly from the robot 100*a* or may be learned from an external device such as the AI server 200.

At this time, the robot 100*a* may perform the operation by generating the result by directly using the learning model, but the sensor information may be transmitted to the external device such as the AI server 200 and the generated result may be received to perform the operation.

The robot 100*a* may use at least one of the map data, the object information detected from the sensor information, or the object information acquired from the external apparatus to determine the travel route and the travel plan, and may control the driving unit such that the robot 100*a* travels along the determined travel route and travel plan.

The map data may include object identification information about various objects arranged in the space in which the robot 100*a* moves. For example, the map data may include object identification information about fixed objects such as walls and doors and movable objects such as pollen and desks. The object identification information may include a name, a type, a distance, and a position.

In addition, the robot 100*a* may perform the operation or travel by controlling the driving unit based on the control/interaction of the user. At this time, the robot 100*a* may acquire the intention information of the interaction due to the user's operation or speech utterance, and may determine the response based on the acquired intention information, and may perform the operation.

<AI+Self-Driving>

The self-driving vehicle 100*b*, to which the AI technology is applied, may be implemented as a mobile robot, a vehicle, an unmanned flying vehicle, or the like.

The self-driving vehicle 100*b* may include a self-driving control module for controlling a self-driving function, and the self-driving control module may refer to a software module or a chip implementing the software module by hardware. The self-driving control module may be included in the self-driving vehicle 100*b* as a component thereof, but may be implemented with separate hardware and connected to the outside of the self-driving vehicle 100*b*.

The self-driving vehicle 100*b* may acquire state information about the self-driving vehicle 100*b* by using sensor information acquired from various kinds of sensors, may detect (recognize) surrounding environment and objects, may generate map data, may determine the route and the travel plan, or may determine the operation.

Like the robot 100*a*, the self-driving vehicle 100*b* may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external apparatus to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. At this time, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

At this time, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AT technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
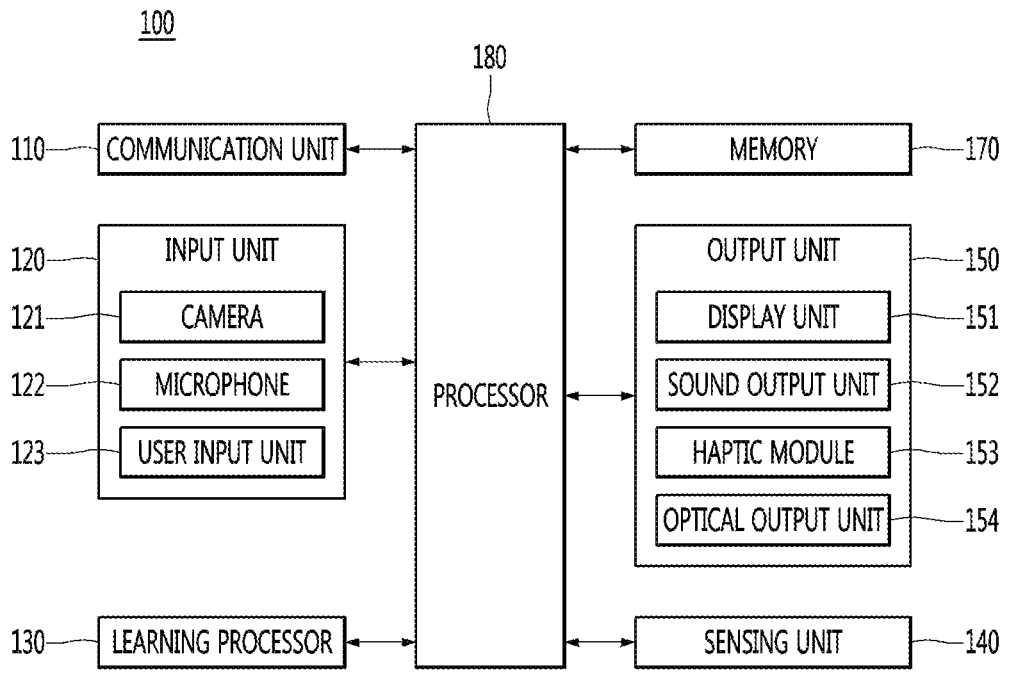
FIG. 4 is a diagram showing an AI device according to another embodiment of the present invention.

FIG. 4 shows an AI device 100 according to an embodiment of the present invention.

A repeated description of FIG. 1 will be omitted.

Referring to FIG. 4, an input unit 120 may include a camera 121 for receiving a video signal, a microphone 122 for receiving an audio signal and a user input unit 123 for receiving information from a user.

Audio data or image data collected by the input unit 120 may be analyzed and processed as a control command of the user.

The input unit 120 receives video information (or signal), audio information (or signal), data or information received from the user, and the AI device 100 may include one or a plurality of cameras 121 for input of the video information.

The camera 121 processes an image frame such as a still image or a moving image obtained by an image sensor in a video call mode or a shooting mode. The processed image frame may be displayed on a display unit 151 or stored in a memory 170.

The microphone 122 processes external acoustic signals into electrical sound data. The processed sound data may be variously utilized according to the function (or the application program) performed in the AI device 100. Meanwhile, various noise removal algorithms for removing noise generated in a process of receiving the external acoustic signal is applicable to the microphone 122.

The user input unit 123 receives information from the user. When information is received through the user input unit 123, a processor 180 may control operation of the AI device 100 in correspondence with the input information.

The user input unit 123 may include a mechanical input element (or a mechanical key, for example, a button located on a front/rear surface or a side surface of the terminal 100, a dome switch, a jog wheel, a jog switch, and the like) and a touch input element. As one example, the touch input element may be a virtual key, a soft key or a visual key, which is displayed on a touchscreen through software processing, or a touch key located at a portion other than the touchscreen.

An output unit 150 may include at least one of a display unit 151, a sound output unit 152, a haptic module 153, and an optical output unit 154.

The display unit 151 displays (outputs) information processed in the AI device 100. For example, the display unit 151 may display execution screen information of an application program executing at the AI device 100 or user interface (UI) and graphical user interface (GUI) information according to the execution screen information.

The display unit 151 may have an inter-layered structure or an integrated structure with a touch sensor so as to implement a touchscreen. The touchscreen may provide an output interface between the terminal 100 and a user, as well as functioning as the user input unit 123 which provides an input interface between the AI device 100 and the user.

The sound output unit 152 may output audio data received from a communication unit 110 or stored in the memory 170 in a call signal reception mode, a call mode, a record mode, a voice recognition mode, a broadcast reception mode, and the like.

The sound output unit 152 may include at least one of a receiver, a speaker, a buzzer or the like.

The haptic module 153 may generate various tactile effects that can be felt by a user. A representative example of tactile effect generated by the haptic module 153 may be vibration.

The optical output unit 154 may output a signal indicating event generation using light of a light source of the AI device 100. Examples of events generated in the AI device 100 may include a message reception, a call signal reception, a missed call, an alarm, a schedule notice, an email reception, an information reception through an application, and the like.

Figure 5:
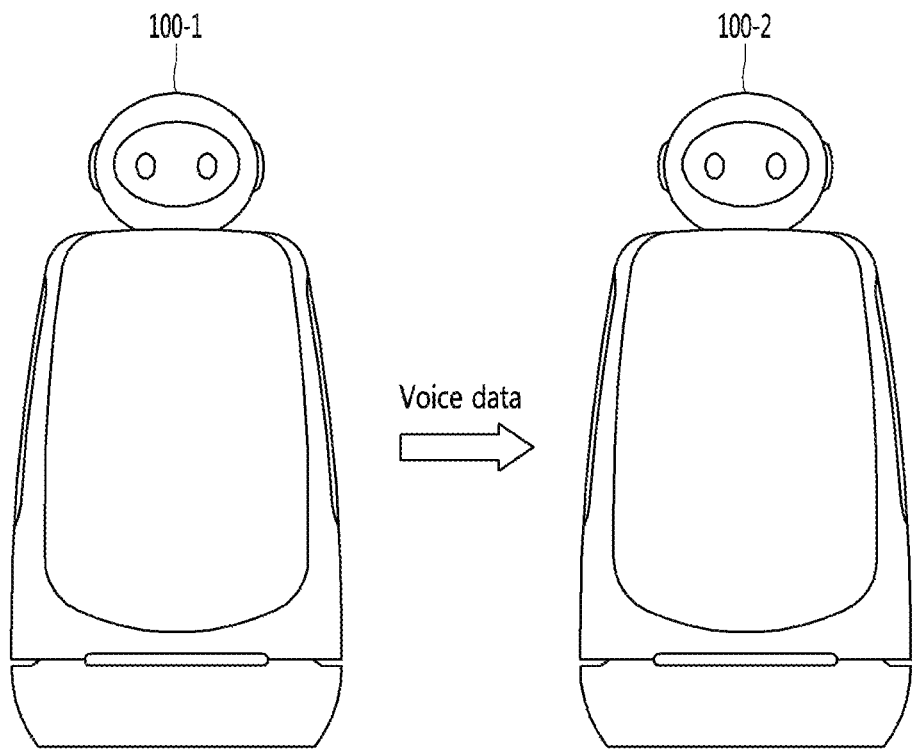
FIG. 5 is a diagram showing the configuration of a robot system according to an embodiment of the present invention.

FIG. 5 is a diagram showing the configuration of a robot system according to an embodiment of the present invention.

Referring to FIG. 5, a robot system 500 may include a first artificial intelligence robot 100-1 and a second artificial intelligence robot 100-2.

Although two robots are described in FIG. 5, the robot system 500 may include more robots.

The first artificial intelligence robot 100-1 and the second artificial intelligence robot 100-2 may include the components of FIG. 1 or 4. The first artificial intelligence robot 100-1 and the second artificial intelligence robot 100-2 may be examples of the robot 100a shown in FIG. 3.

The first artificial intelligence robot 100-1 and the second artificial intelligence robot 100-2 may perform communication with each other through the communication unit 110.

The first artificial intelligence robot 100-1 and the second artificial intelligence robot 100-2 may be installed in an airport or a building.

Each of the first artificial intelligence robot 100-1 and the second artificial intelligence robot 100-2 may be changed to an activation state according to a wake-up word uttered by a user.

The activation state may refer to a state in which a voice recognition function is activated and a deactivation state may refer to a state in which the voice recognition function is deactivated. Each of the first artificial intelligence robot 100-1 and the second artificial intelligence robot 100-2 may be changed to an activation state according to reception of a predetermined wake-up word.

The activation state may refer to a state in which a user may receive an operation command for controlling the operation of the artificial intelligence robot and a deactivation state may refer to a state in which the operation command may not be received.

Next, FIG. 6 will be described.

Figure 6:
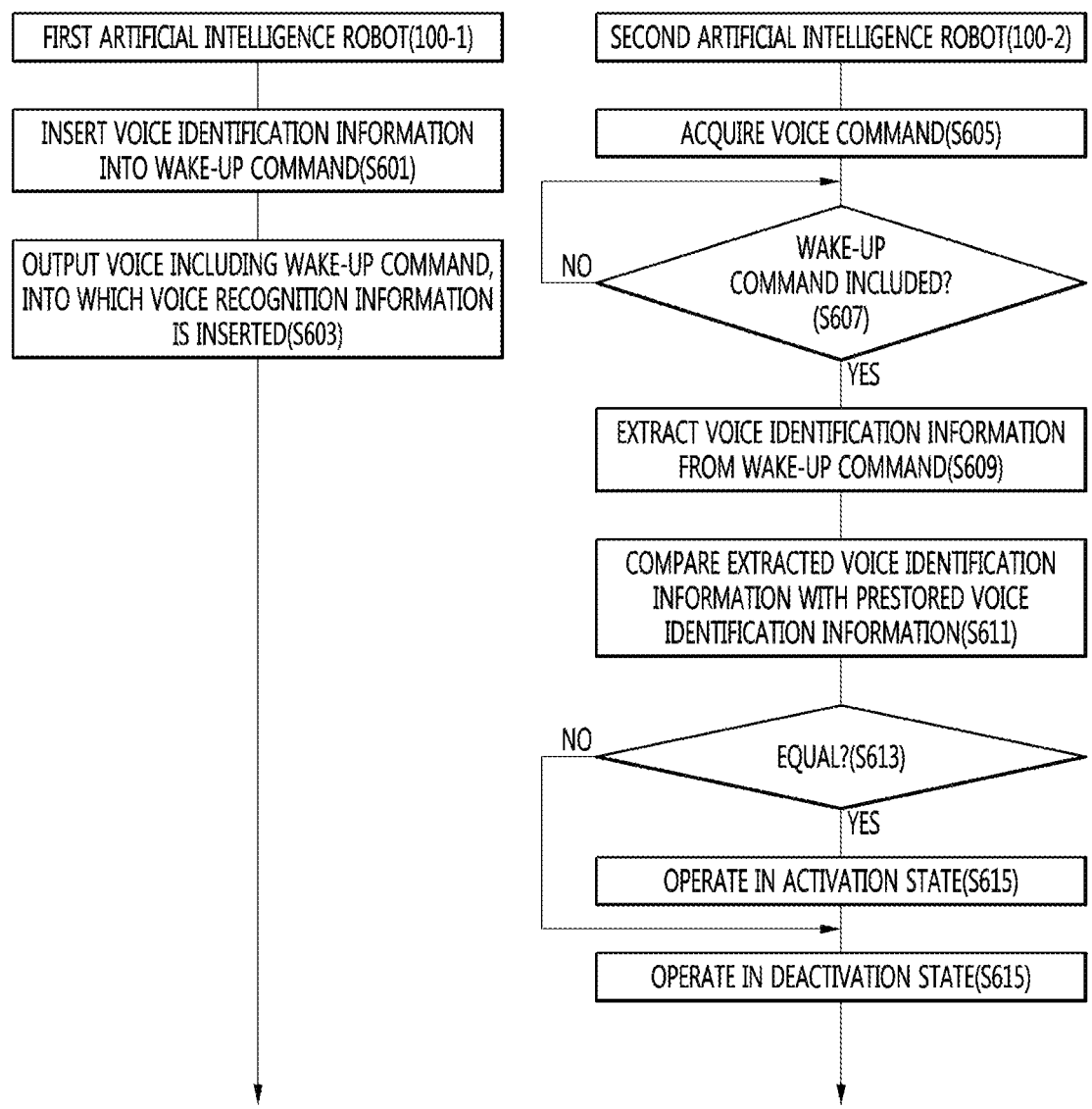
FIG. 6 is a ladder diagram illustrating a method of operating a robot system according to an embodiment of the present invention.

FIG. 6 is a ladder diagram illustrating a method of operating a robot system according to an embodiment of the present invention.

In the following embodiment, assume that the first artificial intelligence robot 100-1 and the second artificial intelligence robot 100-2 are in the deactivation state.

The processor 180 of the first artificial intelligence robot 100-1 inserts voice identification information into a wake-up word (S601).

For example, the voice identification information may be information for identifying voice uttered by the first artificial intelligence robot 100-1.

In another example, the voice identification information may be information for identifying the first artificial intelligence robot 100-1.

In another example, the voice identification information inserted into the wake-up command may be used to maintain the artificial intelligence robot in the deactivation state.

That is, the voice identification information may be inserted not to activate another artificial intelligence robot.

The voice identification information may be inserted into voice data corresponding to the wake-up command.

Specifically, the voice identification information may be inserted into a non-audible frequency band (a band other than 20 to 2000 Hz) of the voice data.

The voice identification information may be a watermark. The watermark may be a signal inserted into a specific frequency band of a voice signal corresponding to the wake-up command. Here, the specific frequency band may be included in the non-audible frequency band.

The processor 180 of the first artificial intelligence robot 100-1 outputs voice including the wake-up command, into which the voice identification information is inserted, through the sound output unit 152 (S603).

The voice command may indicate voice representing a guidance message for guiding change of the first artificial intelligence robot 100-1 to the activation state. To this end, the voice command may include the wake-up command.

For example, the guidance message may be <Please say hi gg to activate me>. Here, <hi gg> may be a wake-up command.

The processor 180 of the second artificial intelligence robot 100-2 acquires the voice command through the microphone 122 (S605).

The processor 180 may receive the voice command from the outside through the microphone 122.

The processor 180 may receive the voice command corresponding to the voice output from the first artificial intelligence robot 100-2.

The processor 180 of the second artificial intelligence robot 100-2 determines whether the wake-up command is included in the acquired voice command (S607).

The processor 180 may convert voice data corresponding to the voice command into text data. To this end, the processor 180 may include a speech-to-text (STT) engine for voice (speech) data into text data.

The processor 180 may determine whether text corresponding to the wake-up command is included in the converted text data.

The processor 180 of the second artificial intelligence robot 100-2 extracts the voice identification information from the wake-up command when the wake-up command is included in the voice command (S609).

The processor 180 may filter a signal corresponding to the non-audible frequency band from the voice signal corresponding to the voice command. To this end, a band pass filter may be provided, but this is merely an example.

The processor 180 may extract the voice identification information from the voice signal corresponding to the wake-up command, when the wake-up command is included in the voice command.

The processor 180 may extract a signal indicating the voice identification information from the voice signal corresponding to the wake-up command.

Specifically, when the voice identification information is a signal indicating the watermark inserted into a specific frequency band, the processor 180 may extract the signal from the specific frequency band.

The processor 180 of the second artificial intelligence robot 100-2 compares the extracted voice identification information with voice identification information prestored in the memory 170 (S611).

When the voice identification information is a signal indicating the watermark inserted into a specific frequency band, the processor 180 may compare the waveform of the extracted signal with the waveform of the prestored signal.

When the waveform of the extracted signal is equal to that of the prestored signal, the processor 180 may determine that the extracted voice identification information and the prestored voice identification information are the same.

When the waveform of the extracted signal is not equal to that of the prestored signal, the processor 180 may determine that the extracted voice identification information and the prestored voice identification information are not the same.

The processor 180 of the second artificial intelligence robot 100-2 determines whether the extracted voice identification information is equal to the prestored voice identification information as the result of comparison (S613), and, if so, operates in the activation state (S615).

That is, when the extracted voice identification information is equal to the prestored voice identification information, the processor 180 may change the deactivation state of the second artificial intelligence robot 100-2 to the activation state.

The second artificial intelligence robot 100-2 may wait for reception of an operation command in the activation state.

When the second artificial intelligence robot 100-2 is changed from the deactivation state to the activation state, the processor 180 of the second artificial intelligence robot 100-2 may output notification sound indicating that the voice recognition service is ready to be provided through the sound output unit 152.

The processor 180 of the second artificial intelligence robot 100-2 operates in the deactivation state, upon determining that the extracted voice identification information is not equal to the prestored voice identification information as the result of comparison (S617).

That is, the second artificial intelligence robot 100-2 may maintain operation in the deactivation state.

At this time, the second artificial intelligence robot 100-2 may maintain the deactivation state even though the wake-up command has been received. This is because, when the wake-up command is included in the guidance message output from the first artificial intelligence robot 100-1, the second artificial intelligence robot 100-2 should not unintentionally react with the wake-up command.

That is, the second artificial intelligence robot 100-2 does not react even if the wake-up command is included in the speech output from the first artificial intelligence robot 100-1, thereby preventing erroneous operation.

Figure 7:
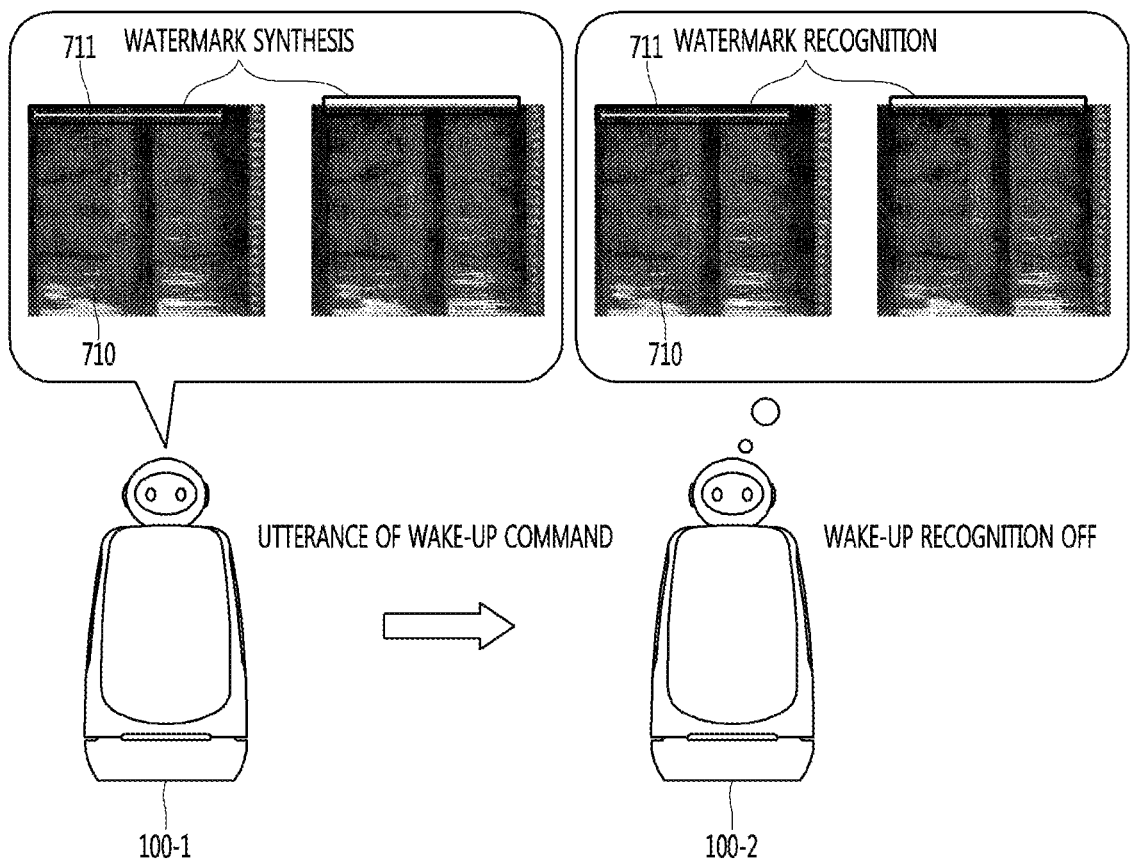
FIG. 7 is a view illustrating a process of inserting a watermark into voice data corresponding to a wake-up command at a first artificial intelligence robot and recognizing the inserted watermark at a second artificial intelligence robot.

FIG. 7 is a view illustrating a process of inserting a watermark into voice data corresponding to a wake-up command at a first artificial intelligence robot and recognizing the inserted watermark at a second artificial intelligence robot.

Referring to FIG. 7, the first artificial intelligence robot 100-1 may insert a watermark 711 into the voice data 710 corresponding to the wake-up command.

The voice data 710 may be data obtained by converting the text data of the wake-up command into voice.

In FIG. 7, the voice data 710 may indicate a power spectrum. The power spectrum may be a parameter indicating which frequency component is included with which magnitude in the waveform of a voice signal which varies with time.

The power spectrum may be a spectrum showing the distribution of an amplitude squared value according to the frequency of the waveform of the voice signal.

The watermark 711 inserted into a specific frequency band may be inserted into the voice data 710 represented by the power spectrum. The watermark 711 may correspond to the voice signal inserted into the specific frequency band.

The watermark 711 may be inserted into the non-audible frequency band.

As the watermark 711 is inserted into the non-audible frequency band, the user cannot listen to the voice of the frequency band, into which the watermark 711 is inserted.

Accordingly, the voice output from the first artificial intelligence robot 100-1 is not distorted, such that the user can listen to voice without inconvenience.

The first artificial intelligence robot 100-1 may output the voice data 710 including the wake-up command.

For example, the voice data 710 may correspond to the guidance message <Please say hi gg to activate me>.

The second artificial intelligence robot 100-2 may receive the voice data 710 including the wake-up command output from the first artificial intelligence robot 100-1.

The second artificial intelligence robot 100-2 may recognize the watermark 711 from the received voice data 710.

The processor 180 of the second artificial intelligence robot 100-2 may extract the power spectrum of a specific frequency band from the voice data 710 in the form of the power spectrum and determine whether the extracted power spectrum matches a predetermined power spectrum.

The processor 180 may determine that the watermark is recognized when the extracted power spectrum matches the predetermined power spectrum, and maintain the second artificial intelligence robot 100-2 in the deactivation state.

Therefore, even if the first artificial intelligence robot 100-1 outputs the guidance message including the wake-up command, the second artificial intelligence robot 100-2 recognizes the watermark inserted into the wake-up command not to be activated.

That is, the second artificial intelligence robot 100-2 may not erroneously operate due to erroneous recognition of the wake-up command.

Figure 8:
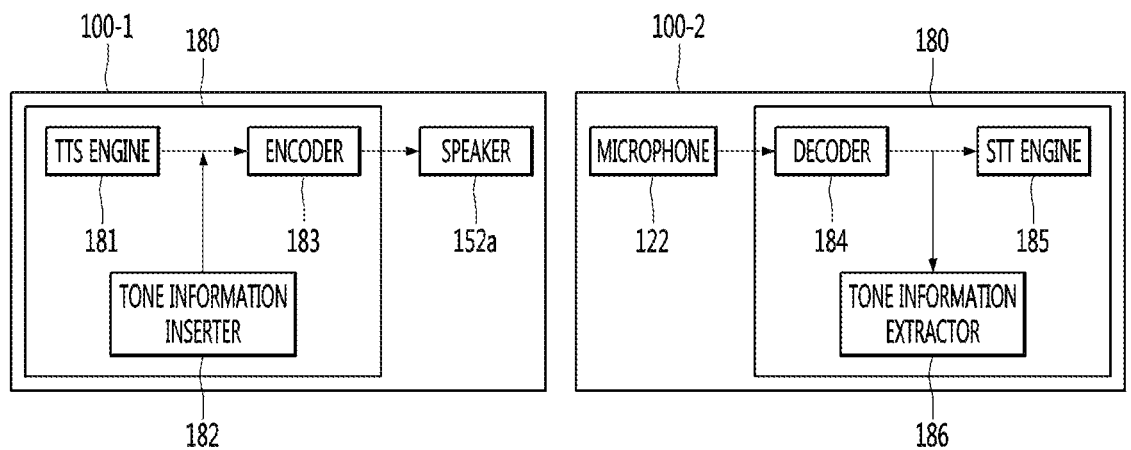
FIG. 8 is a view illustrating a process of inserting a specific tone into voice data corresponding to a wake-up command at a first artificial intelligence robot and recognizing the tone at a second artificial intelligence robot according to another embodiment of the present invention.

FIG. 8 is a view illustrating a process of inserting a specific tone into voice data corresponding to a wake-up command at a first artificial intelligence robot and recognizing the tone at a second artificial intelligence robot according to another embodiment of the present invention.

FIG. 8 shows some components of each of the first artificial intelligence robot 100-1 and the second artificial intelligence robot 100-2.

The processor 180 of the first artificial intelligence robot 100-1 may include a TTS engine 181, a tone information inserter 182, an encoder 183 and a speaker 152a.

The TTS engine 181 may convert the text data corresponding to the wake-up command to the voice data.

The tone information inserter 182 may insert tone information for identifying the voice of the first artificial intelligence robot 100-1 into the converted voice data.

The tone information inserter 182 may convert the frequency band of the converted voice data into a specific frequency band. That is, conversion of the frequency band of the voice data into the specific frequency band may be interpreted as insertion of the tone information.

Each artificial intelligence robot may convert the voice data into different frequency bands, in order to output voices having different tones.

The encoder 183 may encode the voice data, into which the tone information is inserted.

The speaker 152a may output the encoded voice data.

The microphone 122 of the second artificial intelligence robot 100-2 may receive the voice data output from the speaker of the first artificial intelligence robot 100-1.

The processor 180 of the second artificial intelligence robot 100-2 may include a decoder 184, an STT engine 185 and a tone information extractor 186.

The decoder 184 may decode the voice data received from the microphone 122.

The STT engine 185 may convert the decoded voice data into text data.

The tone information extractor 186 may extract the tone information of the voice data from the decoded voice data.

The tone information extractor 186 may acquire the frequency band of the voice data and determine the acquired frequency band as the tone of the voice data.

The processor 180 of the second artificial intelligence robot 100-2 may maintain the second artificial intelligence robot 100-2 in the deactivation state, when the frequency band of the voice data does not match a predetermined frequency band.

The predetermined frequency band may correspond to the tone output from the second artificial intelligence robot 100-2 and may be included in the non-audible frequency band.

That is, the second artificial intelligence robot 100-2 may maintain the voice recognition deactivation state, when voice having a tone different from that of the voice output therefrom is received.

According to the embodiment of the present invention, the second artificial intelligence robot 100-2 may determine the tone of the voice output from the first artificial intelligence robot 100-1 and may not be activated by the wake-up command included in the voice when the tone of the voice output from the first artificial intelligence robot 100-1 is different from the tone of the voice of the second artificial intelligence robot 100-2.

The second artificial intelligence robot 100-2 is unlikely to erroneously operate due to erroneous recognition of the wake-up command.

Figure 9:
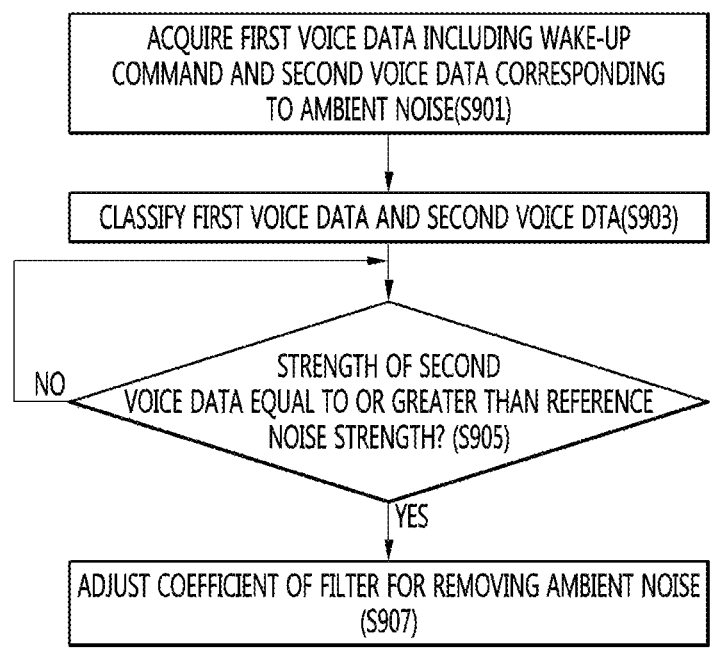
FIG. 9 is a flowchart illustrating a method of operating an artificial intelligence robot according to another embodiment of the present invention.

FIG. 9 is a flowchart illustrating a method of operating an artificial intelligence robot according to another embodiment of the present invention.

FIG. 9 relates to a method of efficiently controlling ambient noise when the second artificial intelligence robot 100-2 receives voice output from the first artificial intelligence robot 100-1 and ambient noise.

Referring to FIG. 9, the processor 180 of the second artificial intelligence robot 100-2 acquires first voice data including the wake-up command and second voice data corresponding to ambient noise through the microphone 122 (S901).

The first voice data including the wake-up command corresponds to the voice output from the first artificial intelligence device 100-1.

The processor 180 of the second artificial intelligence robot 100-2 classifies the acquired first and second voice data according to the strength of each voice data (S903).

The processor 180 may measure the first strength of the first voice data and the second strength of the second voice data.

The processor 180 may determine whether the first strength and the second strength are equal to or greater than a reference strength.

The processor 180 may recognize the second voice data as ambient noise, when the first strength is equal to or greater than the reference strength and the second strength is less than the reference strength.

The processor 180 of the second artificial intelligence robot 100-2 determines whether the strength of the second voice data is equal to or greater than a reference noise strength (S905).

The processor 180 of the second artificial intelligence robot 100-2 adjusts the coefficient of a filter for removing ambient noise, upon determining that the strength of the second voice data is equal to or greater than the reference noise strength (S907).

That is, the processor 180 may adjust the coefficient of the filter in order to effectively remove ambient noise input through the microphone 122.

By removing ambient noise, it is possible to more accurately recognize the wake-up command output from the first artificial intelligence robot 100-1.

The present invention mentioned in the foregoing description can also be embodied as computer readable codes on a computer-readable recording medium. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the processor 180 of the artificial intelligence device.

The invention claimed is:

1. An artificial intelligence robot for providing a voice recognition service, the artificial intelligence robot comprising:
    a speaker;
    a memory configured to store voice identification information;
    a microphone configured to receive a voice command received from another artificial intelligence robot; and
    a processor configured to:
        recognize a wake-up command from the voice command, wherein the wake-up command is used to activate the voice recognition service,
        extract voice identification information from the wake-up command included in the voice command,
        operate a voice recognition function in a deactivation state when the extracted voice identification information does not match the voice identification information stored in the memory, and
        operate the voice recognition function in an activation state when the extracted voice identification information matches the voice identification information stored in the memory,
    wherein the processor is further configured to:
        convert text data corresponding to the wake-up command into voice data,
        convert a frequency band of the converted voice data into a specific frequency band identifying the artificial intelligence robot,
        encode the converted voice data having the specific frequency band, and
        output the encoded voice data through the speaker, and
    wherein the voice identification information is information for identifying voice of another artificial intelligence robot and is a watermark inserted into the voice data corresponding to the wake-up command.

2. The artificial intelligence robot according to claim 1, wherein the watermark includes a signal indicating that the voice recognition function needs to be maintained in the deactivation state.

3. The artificial intelligence robot according to claim 1, wherein the watermark is inserted into a non-audible frequency band of a frequency band of the voice data.

4. The artificial intelligence robot according to claim 1, wherein the voice identification information includes data obtained by converting a frequency band of the voice data corresponding to the wake-up command into a specific frequency band.

5. The artificial intelligence robot according to claim 1, wherein the voice command is a guidance message for inducing activation of the voice recognition service.

6. A method of operating an artificial intelligence robot for providing a voice recognition service, the method comprising:
    receiving a voice command received from another artificial intelligence robot;
    recognizing a wake-up command from the voice command, wherein the wake-up command is used to activate the voice recognition service;
    extracting voice identification information from the wake-up command included in the voice command and used to activate the voice recognition service;
    determining whether the extracted voice identification information matches voice identification information stored in a memory; and
    operating a voice recognition function in a deactivation state when the extracted voice identification information does not match the voice identification information stored in the memory,
    wherein the method further comprises:
        converting text data corresponding to the wake-up command into voice data;

converting a frequency band of the converted voice data into a specific frequency band identifying the artificial intelligence robot;

encoding the converted voice data having the specific frequency band; and outputting the encoded voice data through a speaker in the artificial intelligence robot, and wherein the voice identification information is information for identifying voice of another artificial intelligence robot and is a watermark inserted into the voice data corresponding to the wake-up command.

7. The method according to claim 6, wherein the watermark includes a signal indicating that the voice recognition function needs to be maintained in the deactivation state, and the watermark is inserted into a non-audible frequency band of a frequency band of the voice data.

8. The method according to claim 6, wherein the voice identification information includes data obtained by converting a frequency band of the voice data corresponding to the wake-up command into a specific frequency band.

9. The method according to claim 6, wherein the voice command is a guidance message for inducing activation of the voice recognition service.

10. The artificial intelligence robot according to claim 1, wherein the matching of the voice identification information is based on an extracted power spectrum that is based on an amplitude squared value of a non-audible frequency band.

11. The method according to claim 6, wherein the determining is based on an extracted power spectrum that is based on an amplitude squared value of a non-audible frequency band.

* * * * *